(12) United States Patent
Hannon (10) Patent No.: US 9,642,346 B2
(45) Date of Patent: May 9, 2017

(54) FISHING LINE GUIDE SYSTEM (75) Inventor: Robert Douglas Hannon, Odessa, FL (US)

(73) Assignee: Angling Technologies, LLC, Boca Raton, FL (US)

( * ) Notice: Subject to any disclaimer, the term of this patent is extended or adjusted under 35 U.S.C. 154(b) by 0 days.

(21) Appl. No.: 12/800,955

(22) Filed: May 26, 2010

(65) Prior Publication Data

US 2011/0289818 A1 Dec. 1, 2011

(51) Int. Cl.
*A01K 87/04* (2006.01)
*A01K 87/00* (2006.01)

(52) U.S. Cl.
CPC ............ *A01K 87/04* (2013.01); *A01K 87/005* (2013.01)

(58) Field of Classification Search
CPC ..... A01K 87/04; A01K 87/005; A01K 87/002
USPC ............................................................. 43/24
See application file for complete search history.

(56) References Cited

U.S. PATENT DOCUMENTS

| | | | | |
|---|---|---|---|---|
| 1,781,569 A | * | 11/1930 | Cook | A01K 87/04 43/24 |
| 2,398,862 A | * | 4/1946 | Sarkisian | 43/24 |
| 2,559,934 A | * | 7/1951 | Briney | 43/18.1 R |
| 2,573,647 A | * | 10/1951 | Marke | 43/24 |
| 2,702,959 A | | 3/1955 | Wiglesworth | |
| 2,721,412 A | * | 10/1955 | Smiley | 43/24 |
| 2,775,054 A | | 12/1956 | Shinbane | |
| 2,872,751 A | * | 2/1959 | Mayfield | 43/24 |
| 3,060,618 A | * | 10/1962 | Grishkin | 43/24 |
| 3,099,889 A | * | 8/1963 | Verneuil | 43/24 |
| 3,608,226 A | * | 9/1971 | Stanley | A01K 91/10 43/15 |
| 4,020,581 A | * | 5/1977 | Genovese | A01K 87/06 43/18.5 |
| 4,051,618 A | * | 10/1977 | Ohmura | 43/24 |
| 4,445,293 A | * | 5/1984 | Ohmura | 43/24 |
| 5,159,776 A | * | 11/1992 | Horton | A01K 87/005 43/24 |
| D340,499 S | | 10/1993 | Ohmura | |
| 5,491,881 A | * | 2/1996 | Collins | 29/417 |
| D393,044 S | * | 3/1998 | Ohmura | D22/143 |
| D395,695 S | | 6/1998 | Ohmura | |
| 5,946,845 A | * | 9/1999 | Yasui et al. | 43/24 |

(Continued)

FOREIGN PATENT DOCUMENTS

JP   H057074 U  *  3/1993
JP   08023832 A  *  1/1996  ............. A01K 87/04

(Continued)

OTHER PUBLICATIONS

Machine translation of JP 2001-190188.*

(Continued)

*Primary Examiner* — Peter M Poon
*Assistant Examiner* — Magdalena Topolski
(74) *Attorney, Agent, or Firm* — Harness, Dickey & Pierce, P.L.C.

(57) ABSTRACT

A fishing line guide system for use on a fishing rod comprising at least two fishing line guides or concentrically aligned guide rings to reduce the helix formed in the fishing line during casting including a primary or proximal guide ring and a secondary or distal guide ring disposed in planes substantially parallel to each other and spaced within a predetermined range or distance relative to each other.

10 Claims, 9 Drawing Sheets

(56) References Cited

U.S. PATENT DOCUMENTS

| | | | |
|---|---|---|---|
| 5,953,847 A * | 9/1999 | Peterson | 43/24 |
| 6,263,609 B1 * | 7/2001 | Kollodge et al. | 43/25 |
| D482,427 S | 11/2003 | Park | |
| D494,249 S | 8/2004 | Grayson | |
| 7,533,484 B2 * | 5/2009 | Markley et al. | 43/18.1 HR |
| D627,032 S | 11/2010 | Gimbert | |
| 2006/0090388 A1 * | 5/2006 | Lee | A01K 87/04 43/24 |
| 2006/0130388 A1 | 6/2006 | Markley et al. | |
| 2010/0236128 A1 * | 9/2010 | Murray | 43/24 |
| 2016/0057985 A1 * | 3/2016 | Farrington | A01K 89/0155 43/4.5 |

FOREIGN PATENT DOCUMENTS

| | | | | |
|---|---|---|---|---|
| JP | 2750818 B2 * | 5/1998 | | |
| JP | 2001190188 A * | 7/2001 | | A01K 87/04 |
| JP | 02001321032 A * | 11/2001 | | |
| JP | 2004081066 A * | 3/2004 | | A01K 87/00 |
| JP | 2005095139 A * | 4/2005 | | A01K 87/04 |
| JP | 5368622 B2 * | 12/2013 | | |

OTHER PUBLICATIONS

International Search Report dated Sep. 6, 2011.
International Preliminary Report on Patentability dated Nov. 27, 2012.
Written Opinion dated Sep. 6, 2011.

* cited by examiner

FISHING LINE GUIDE SYSTEM

BACKGROUND OF THE INVENTION

Field of the Invention

A fishing line guide system for use on a fishing rod and spinning reel comprising at least two concentrically aligned line guides to reduce the helix formed in the fishing line during casting.

Description of the Prior Art

Numerous efforts have been made to improve guides on various fishing rods. None of these designs appears to reduce the helix formed in the fishing line during casting.

U.S. Pat. No. 234,812 shows a line guide for a fishing rod compring a single piece of metal including two tangs or prongs and eyes bent at an angle to the tangs or prongs connected at their meeting edges.

U.S. Pat. No. 387,545 relates to a line guide for fishing rods constructed from a single piece of sheet metal wherein the central portion is punched to form eyes and having shanks projecting therefrom. The eye portions are bent at an angle to the shanks combined with bushings through the eyes closed down upon both sides to form a rounded interior surface for the eyes.

U.S. Pat. No. 1,856,551 discloses a tip for fishing rods comprising a ferrule, arms projecting outwardly from the ferrule, tines projecting outwardly from each arm and eyes between the tines disposed at an angle to the axis of the tip.

U.S. Pat. No. 3,732,644 teaches a fishing pole with means for selectively mounting a fishing reel at various locations spaced circumferentially and longitudinally along the pole. The pole may be provided with a line guide having eyelets of different sizes and designs circumferentially arranged along the intermediate length of the pole to correspond with the location of the associated reel. A stationary or swivel tip line guide may be incorporated. The fishing rod enables a angler to employ a single pole with different types of fishing reels for meeting the needs attendant different types of fishing and different types of terrain encountered during a fishing trip.

U.S. Pat. No. 4,888,906 shows a fishing line guide comprising a guide body including holding bores and line guide rings having guide bores and mounted to the holding bores wherein the axis of each holding bore is slanted longitudinally with respect to the axis of a fishing rod. The inner surface of each guide bore is formed in a quarter circle in section so that each line guide ring is mounted to the holding bore in the relation that the arcuate inner surface of the guide bore is inclined outwardly of the holding bore.

Additional examples of the prior art are found in the following foreign patents. JP 2001-190,188; JP 2003-047,371; JP 2004-129,525; JP 2004-208,575 and EP 0,827,688.

SUMMARY OF THE INVENTION

The present invention relates to a fishing line guide system for use with a fishing rod/spinning reel combination comprising a fishing rod having a plurality of distal fishing line guides attached in spaced relationship relative to each other and to the fishing line guide system along the length thereof and a spinning reel to guide the fishing line during casting and retrieving the fishing line.

The fishing line guide comprises a primary or proximal circular guide ring and a secondary or distal circular guide ring disposed in concentric alignment relative to each other and affixed to the fishing pole by a guide ring mount or frame.

The planes in which the primary or proximal circular guide ring and the secondary or distal circular guide ring are disposed are substantially parallel to each other.

The primary or proximal guide ring and the secondary or distal guide ring are spaced within a predetermined range or distance relative to each other to reduce helixes formed in the fishing line during casting.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE INVENTION

Figure 1:
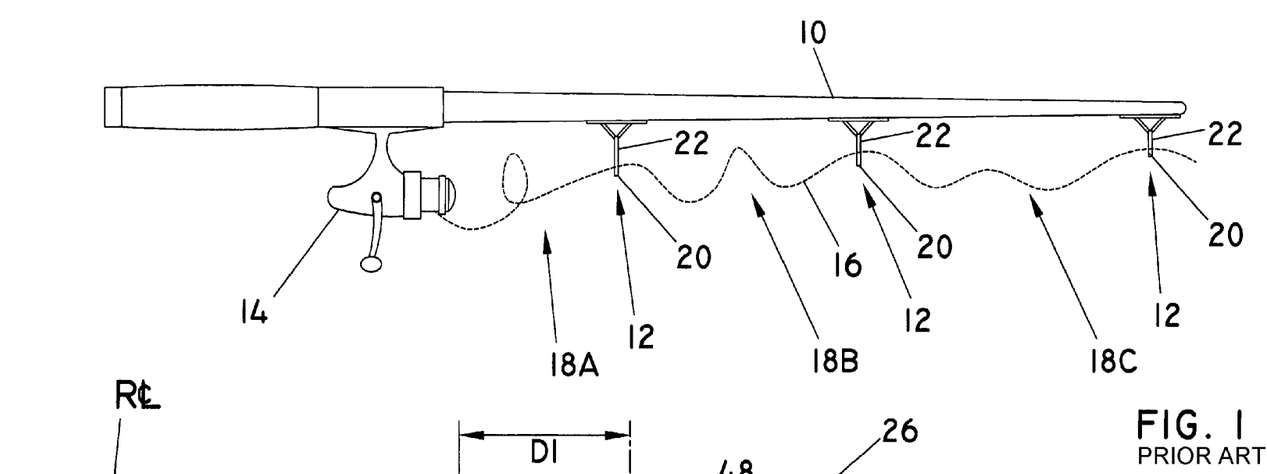
FIG. 1 is prior art and depicts a side view of a fishing rod with standard or conventional fishing line guides in combination with a spinning reel.

FIG. 1 depicts a fishing rod and spinning reel combination comprising a fishing rod 10 having a plurality of conventional fishing line guides each generally indicated as 12 attached or affixed in spaced relationship relative to each other along the length thereof and a spinning reel 14 mounted on the proximal end portion of the fishing rod 10 to payout fishing line 16 when casting a lure or bait and to retrieve the fishing line 16 after casting the lure or bait. As shown, a plurality of helixes generally indicated as 18A, 18B and 18C of decreasing size progressing from the proximal end to the distal end of the fishing rod 10 are formed in the fishing line 16 during a cast.

Each fishing line guide 12 comprise a guide ring 20 affixed to the fishing pole by a corresponding guide ring mount 22. As the diameter of each guide ring 20 decreases from the proximal end portion to the distal end portion of the fishing rod 10, the size of each succeeding helix 18A/18B/18C decreases until the fishing line 16 is virtually straight leaving the fishing rod 10.

Figure 2:
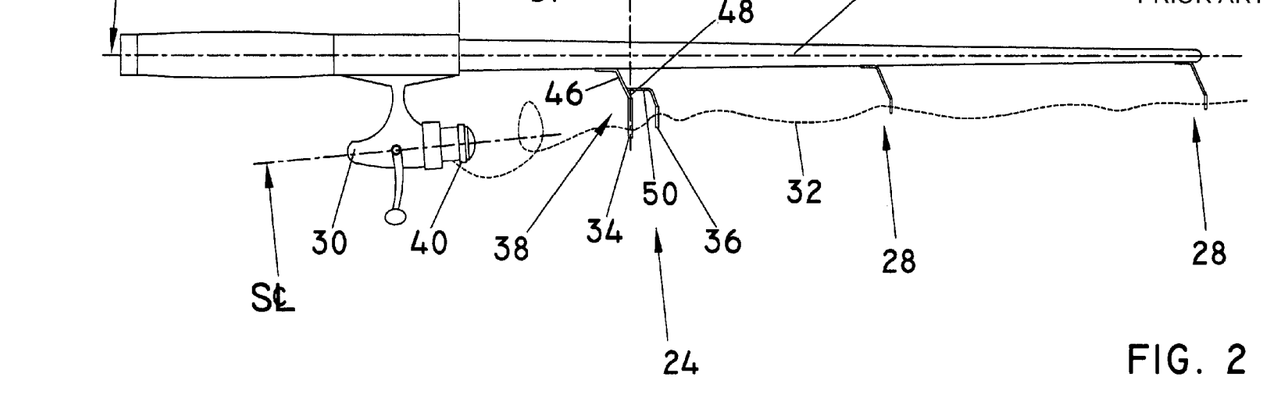
FIG. 2 is a side view of a fishing rod with the fishing line guides of the present invention in combination with a spinning reel.

FIG. 2 depicts the fishing line guide system of the present invention generally indicated as 24 for use with a fishing rod and spinning reel combination comprising a fishing rod 26 having a plurality of distal fishing line guides each indicated as 28 attached in spaced relationship relative to each other and to the fishing line guide system 24 and a spinning reel 30 to guide the fishing line 32 during casting and retrieving the fishing line 32.

Figure 3:
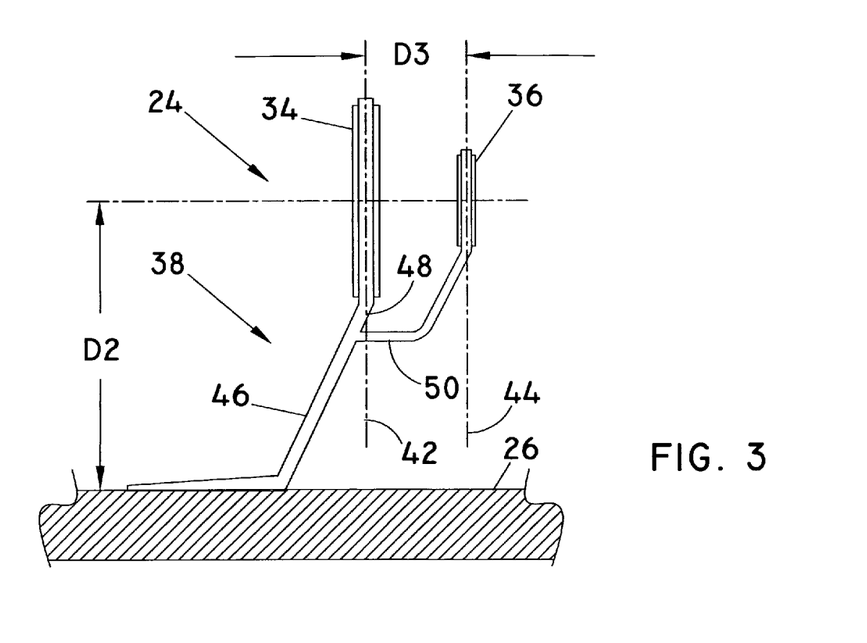
FIG. 3 is a side view of the fishing line guides of the present invention.
Figure 4:
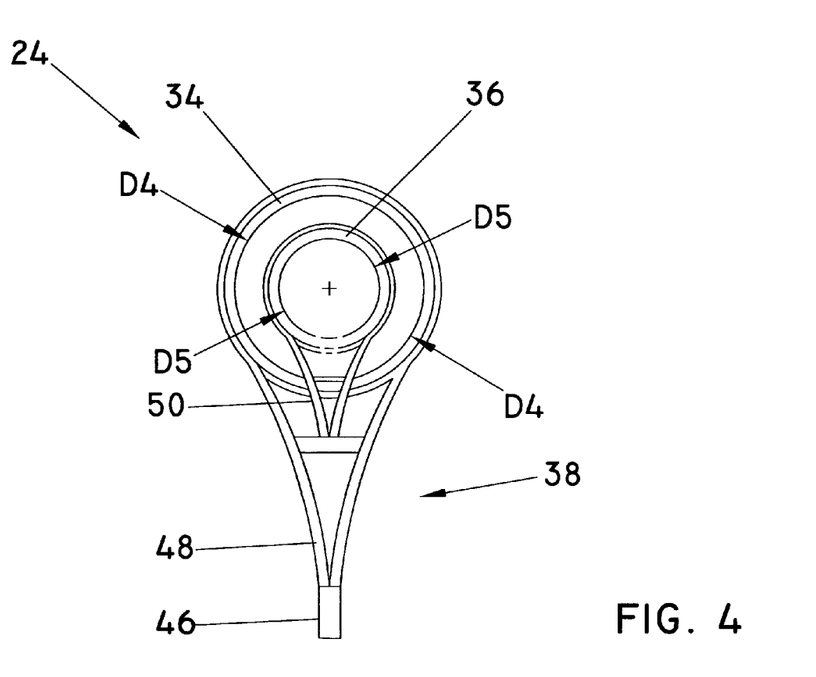
FIG. 4 is a front view of the fishing line guides of the present invention shown in FIG. 3.

As best shown in FIGS. 3 and 4, the fishing line guide 24 comprises a primary or proximal circular guide ring 34 and a secondary or distal circular guide ring 36 disposed in concentric alignment relative to each other and affixed to the fishing pole 26 by a guide ring mount or frame generally indicated as 38.

The center line CL of the spinning reel 30 is inclined toward the center line RCL of the fishing rod 10 such that the fishing line 32 passes essentially through the center of the primary of proximal circular guide ring 34 and the center of the secondary or distal circular guide ring 36.

As shown in FIG. 2, the distance D1 between the front lip 40 of the spinning reel 30 and the primary or proximal circular guide 34 is at least about 7 inches to about 24 inches but preferably 20 inches or ten (10) times the diameter of front lip 40.

As shown in FIG. 3, the planes in which the primary or proximal circular guide ring 34 and the secondary or distal circular guide ring 36 indicated as 42 and 44 respectively are disposed are substantially parallel to each other. As shown in FIG. 3, the distance D2 between the geometric center of the primary or proximal circular guide ring 34 and the upper surface of the fishing rod 26 is from about 1.0 inch to about 1.7 inches or from about one-half (½) to about one-third (⅓) the distance from the center line SCL of the spinning reel 30. As shown in FIG. 3, the distance D3 between the primary or proximal circular guide ring 34 and the second or distal circular guide ring 36 is from about ¼ inch to about 2 inches. As shown in FIG. 4, the inside diameter D4 of the primary or proximal circular guide ring 34 is from about ¾ inch to about 1¼ inches; while, the inside diameter D5 of the secondary or distal circular guide ring 36 from about 6/100 inch to about ½ inch. The distance D3 between the secondary or distal circular guide ring 36 and the primary or proximal circular guide ring 34 is from about 0.2 times to about 2.0 times the inside diameter D4 of the primary or proximal circular guide ring 34. The ratio of the inside diameter D5 of the secondary or distal circular guide ring 36 to the inside diameter D4 of the primary or proximal circular guide ring 34 is from about 0.05 to about 0.7.

As shown in FIGS. 2 and 3, the primary or proximal fishing line guide 34 is affixed or attached to the fishing pole 26 by a guide frame base 46 and a primary or proximal guide frame extension 48; while, the secondary or distal fishing line guide 36 is affixed or attached to the fishing rod 26 by the guide frame base 46 and a secondary or distal guide frame extension 50.

Figure 5:
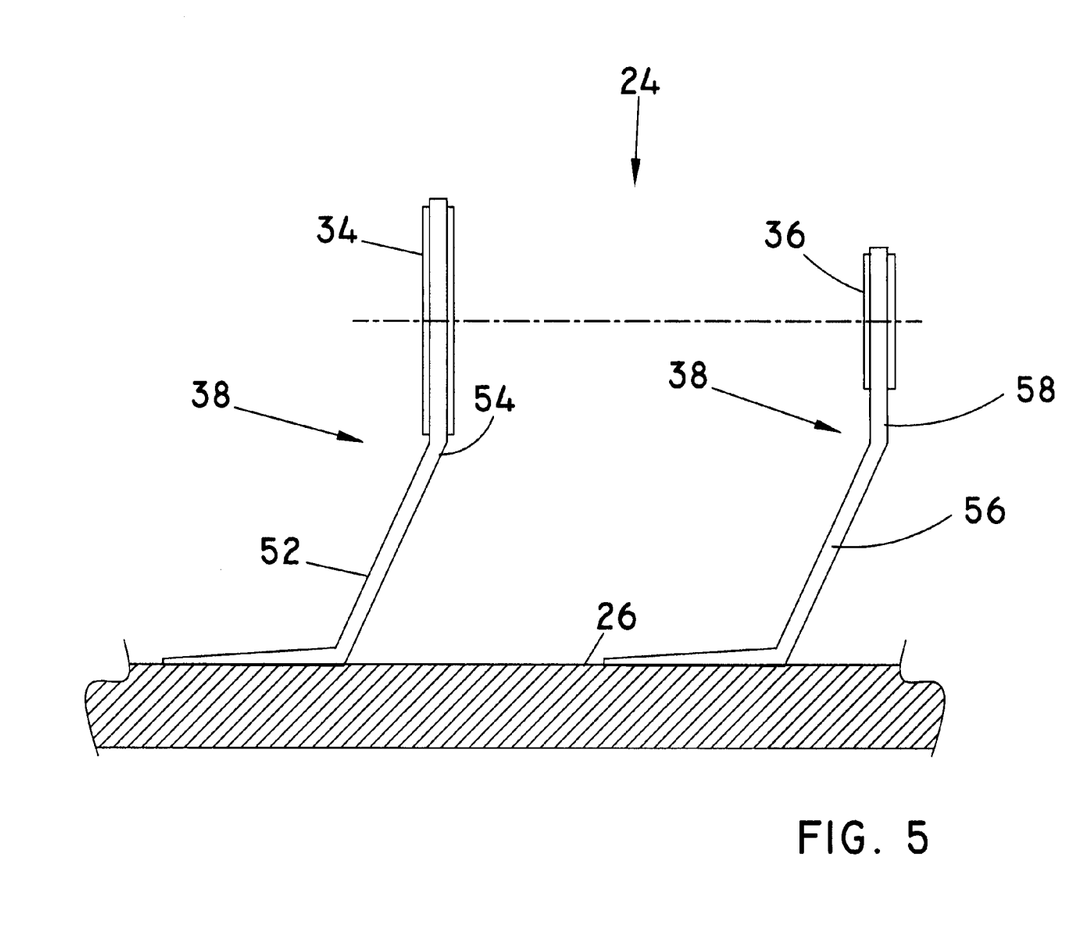
FIG. 5 is a side view of an alternate embodiment of the fishing line guides of the present invention.

FIG. 5 discloses an alternate embodiment of the fishing line guide system 24 with similar components similarly numbered or designated as those depicted in FIGS. 2 through 4. Similarly, the dimensions, relative positioning and sizes or ratios of the components are substantially the same as those described and as depicted in FIGS. 2 through 4. Specifically, the fishing line guide system 24 comprises a primary or proximal circular guide ring 34 and a secondary or distal circular guide ring 36 disposed in concentric alignment relative to each other and affixed to the fishing pole 26 by a corresponding guide ring mount or frame generally indicated as 38. As shown in FIG. 5, the primary or proximal guide frame 38 comprises a primary or proximal guide frame base 52 and a primary or proximal guide frame extension 54; while, the secondary or distal guide frame 38 comprises a secondary or distal guide frame base 56 and a secondary or distal guide frame extension 58.

Figure 6:
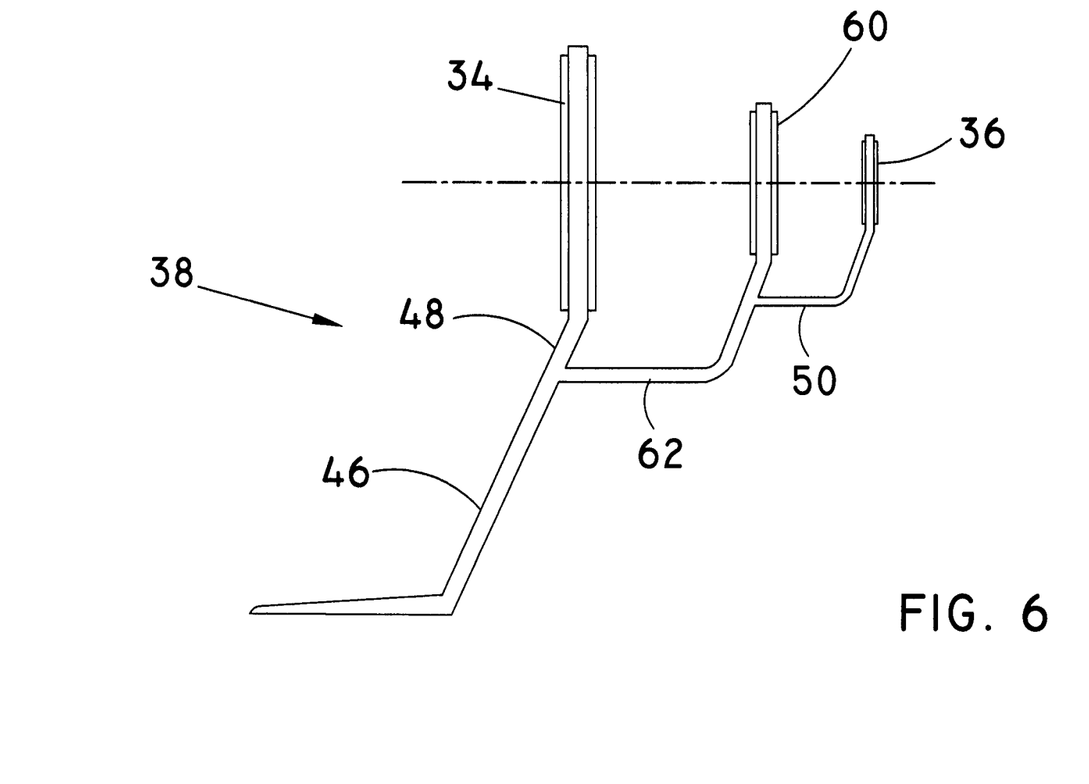
FIG. 6 is a side view of another alternate embodiment of the fishing line guides of the present invention.

FIG. 6 shows another embodiment of the fishing line guide system 24 with similar components similarly numbered or designated as those depicted in FIGS. 2 through 4. Similarly, the dimensions, relative positions and sizes or ratios are substantially the same as depicted in FIGS. 2 through 4. Specifically, the fishing line guide system 24 comprises a primary or proximal circular guide ring 34; a secondary or distal circular guide ring 36 and an intermediate circular guide ring 60 disposed in concentric alignment relative to each other and affixed to the fishing pole 26 by a guide ring mount or frame generally indicated as 38. As shown in FIG. 6, the primary or proximal fishing line guide 34 is affixed or attached to the fishing pole 26 by a guide frame base 46 and a primary or proximal guide frame extension 48, the intermediate circular guide ring 60 is attached or affixed to the guide frame base 46 by an intermediate guide frame extension 62 and the secondary or distal fishing line guide 36 is affixed or attached to the intermediate guide frame extension 62 by a secondary or distal guide frame extension 50.

Figure 7:
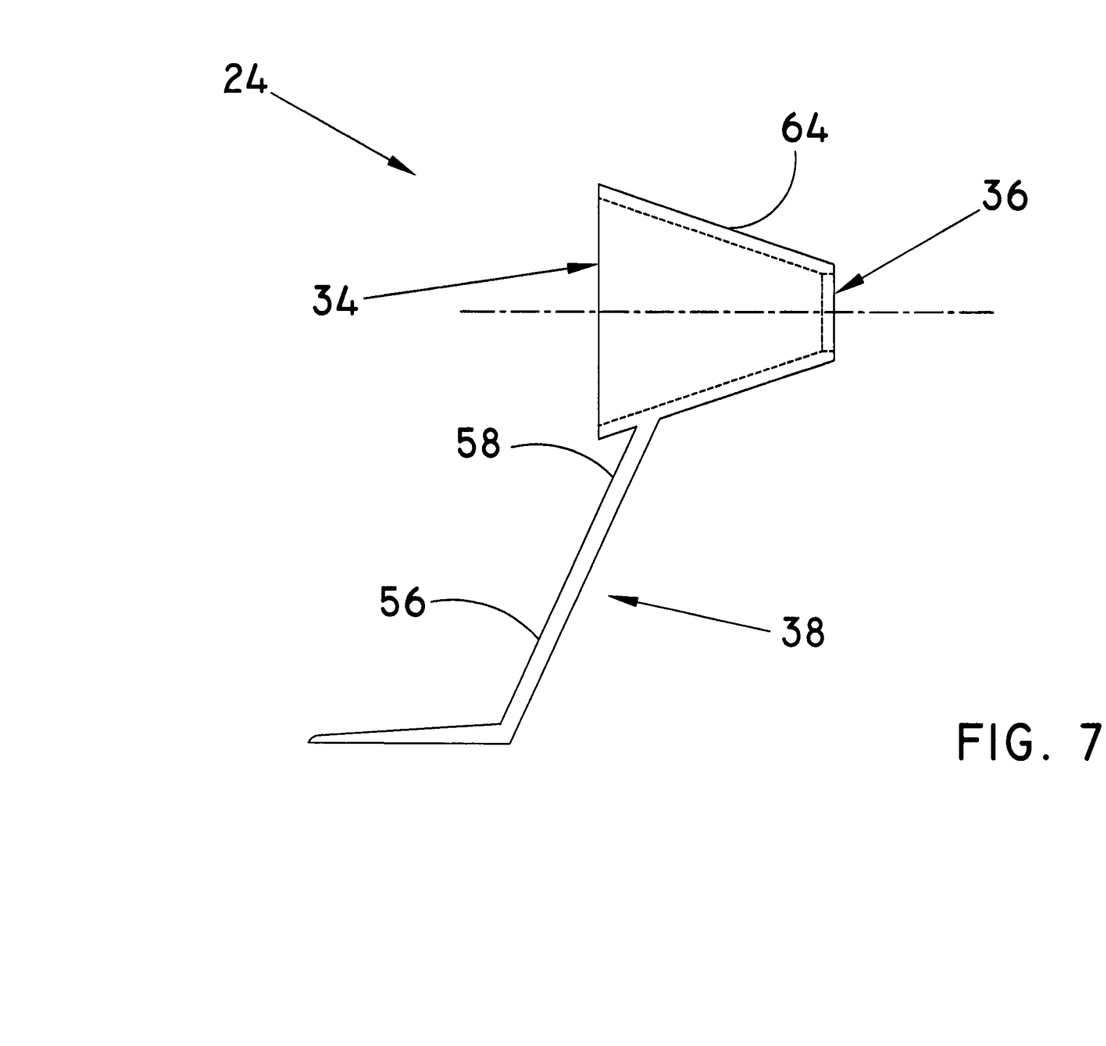
FIG. 7 is a side view of yet another alternate embodiment of the fishing line guides for the present invention.

FIG. 7 shows still another embodiment of the fishing line guide system 24 with similar components similarly numbered or designated. Similarly, the dimensions, relative positions and sizes or ratios are substantially the same as depicted in FIGS. 2 through 4 except as noted. Specifically, the fishing line guide system 24 comprises a primary or proximal circular guide ring or orifice 34 and a secondary or distal circular guide ring or orifice 36 at opposite ends of a hollow frustum conical shell 64 affixed to the fishing pole 26 by a guide ring mount or frame generally indicated as 38. The diameter of the primary or proximal circular guide ring or orifice 34 is about four (4) times the diameter of the secondary or distal circular guide ring or orifice 36.

Figure 8:
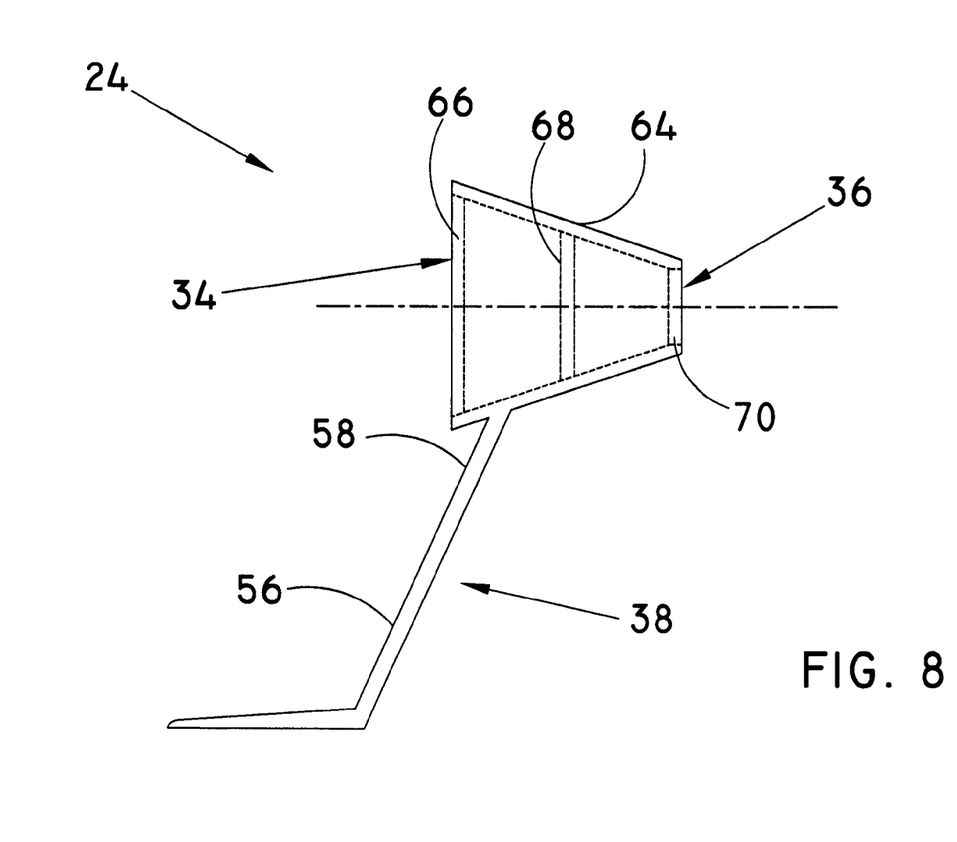
FIG. 8 is a side view of still another alternate embodiment of the fishing line guide of the present invention.

FIG. 8 shows still another embodiment of the fishing line guide system 24 with similar components similarly numbered or designated. Similarly, the dimensions, relative positions and sizes or ratios are substantially, the same as depicted in FIGS. 2 through 4 except as noted. Specifically, the fishing line guide system 24 comprises a primary or proximal circular guide protrusion or bead or ring 66, an intermediate circular guide protrusion or bead or ring 68 and a secondary of distal circular guide protrusion or bead or ring 70 formed or disposed on the inner surface of a hollow frustum conical shell 64 at the proximal end potion adjacent the primary or proximal circular guide orifice 34, the intermediate portion of the hollow frustum conical shell 64 and the distal end portion adjacent the secondary or distal circular guide orifice 36 respectively. The hollow frustum conical shell 64 is affixed to the fishing pole 26 by a guide ring mount or frame generally indicated as 38.

Figure 9:
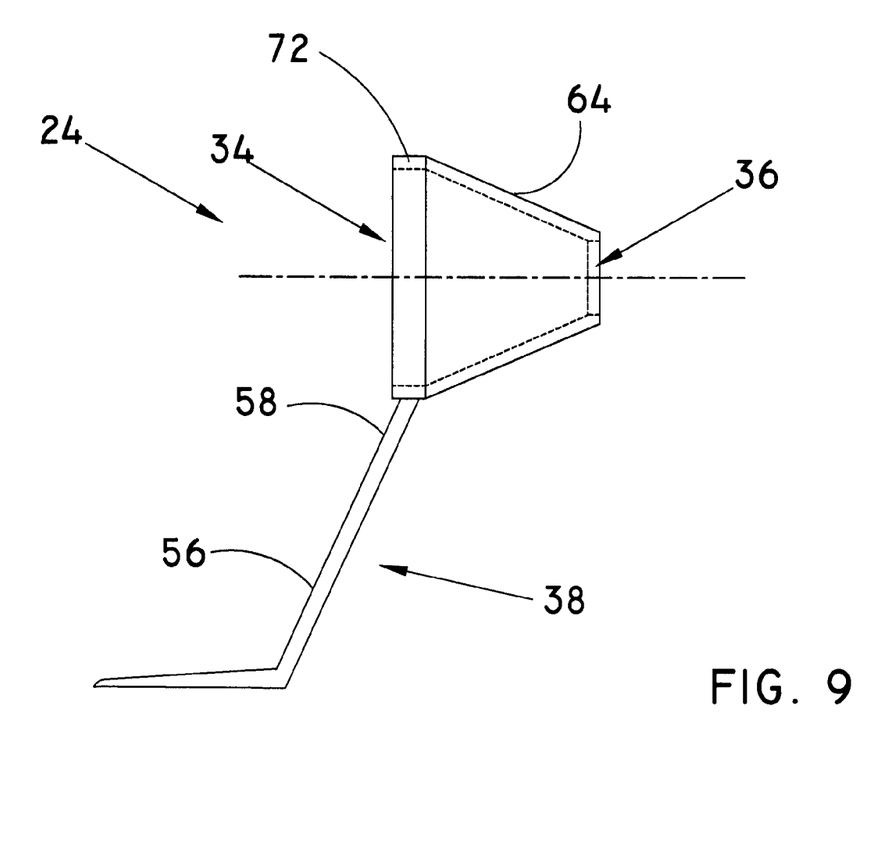
FIG. 9 is a side view of yet still another alternate embodiment of the fishing line guide of the present invention.

FIG. 9 shows yet still another alternate embodiment of the fishing line guide system 24 with similar components similarly numbered or designated. Similarly, the dimensions, relative positions and sizes or ratios are substantially the same as depicted in FIGS. 2 through 4 except as noted. Similarly, the dimensions, relative positions and sizes or ratios are substantially the same as depicted in FIGS. 2 through 4 except as noted. Specifically, the fishing line guide system 24 comprises a primary or proximal circular guide ring or orifice 34 and a secondary or distal circular guide ring or orifice 36 at opposite ends of the hollow frustum conical shell 64 affixed to the fishing pole 26 by a guide ring mount or frame generally indicated as 38. The diameter of the primary or proximal circular guide ring or orifice 34 is about four (4) times the diameter of the secondary or distal circular guide ring or orifice 36. A substantially cylindrical entry lip 72 is disposed adjacent the primary or proximal circular guide ring or orifice 34.

Figure 10:
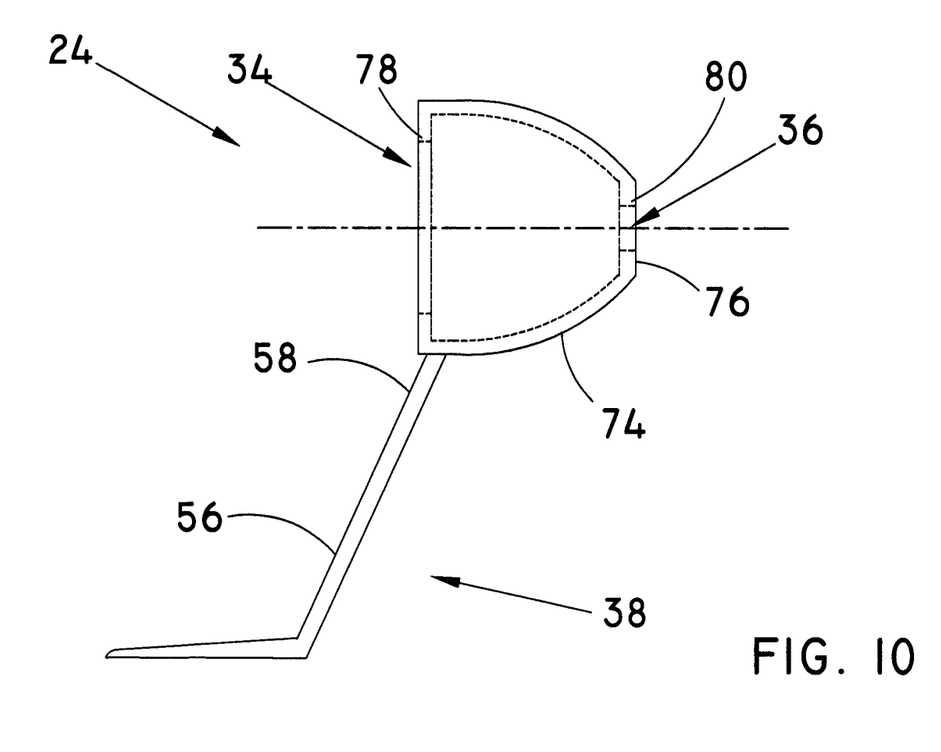
FIG. 10 is a side view of still yet another alternate embodiment of the fishing line guide of the present invention.

FIG. 10 depicts still yet another alternate embodiment of the fishing line guide system 24 with similar components similarly numbered or designated. Similarly, the dimensions, relative positions and sizes or ratios are substantially the same as depicted in FIGS. 2 through 4 except as noted. Specifically, the fishing line guide system 24 comprises a hollow bowl shaped shell 74 including a primary or proximal circular guide ring or orifice 34 and a secondary or distal circular guide ring 36 formed in a distal wall or base 76 formed at opposite ends of the hollow bowl shaped shell 74. A primary or proximal circular guide protrusion or bead 78 and a secondary or distal circular guide protrusion or bead 80 may be formed or disposed on the inner surface of a hollow bowl shaped shell 72 adjacent the primary or proximal circular guide ring or orifice 34 and the secondary or distal fishing line guide 36 respectively. The hollow bowl shaped shell 72 is affixed to the fishing pole 26 by a guide ring mount or frame generally indicated as 38.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A fishing line guide system comprising a fishing rod having a center line, a spinning reel including a front lip end, and at least two fishing line guides disbursed in close proximity to each other to reduce a helix formed in a fishing line having a lure or bait attached to a distal end portion thereof during casting, said fishing line guides spaced within a predetermined range or distance relative to each other wherein the fishing line guide closest to said reel includes a guide ring mount or frame affixed to the fishing rod and a primary or proximal circular guide ring extending from said guide frame and including an inside diameter and an inner circumference disposed in a first plane and an adjacent secondary or distal circular guide ring including an inside diameter smaller than the inside diameter of said proximal circular guide ring and an inner circumference disposed in a second plane and with no other guide rings there between, said proximal circular guide ring and said distal circular guide ring disposed in spaced relationship relative to each other and in concentric alignment relative to each other, said first and second planes in which said primary or proximal circular guide ring and said secondary or distal circular guide ring are disposed substantially parallel to each other, wherein said primary or proximal circular guide ring is affixed or attached to the fishing pole by a guide frame base and a primary or proximal guide frame extension and said secondary or distal circular guide ring is supported by a secondary or distal guide frame extension, and wherein a center line of the spinning reel extends through a first end of the spinning reel and a second end of the spinning reel such that the fishing line strikes the inner circumference of said primary or proximal circular guide ring to eliminate the axial force or direction of the helix and is pulled through said secondary or distal circular guide ring in a substantially straight line by the linear force of the lure or bait during casting.

2. The fishing line guide system of claim 1 wherein the distance between said front lip end of the spinning reel and said primary or proximal circular guide is at least about 7 inches.

3. The fishing line guide system of claim 2 wherein the distance between said front lip end of the spinning reel and said primary or proximal circular guide is substantially 20 inches.

4. The fishing line guide system of claim 1 wherein said front lip end of the spinning reel and said primary or proximal circular guide is ten (10) times the diameter of said front lip of the spinning reel.

5. The fishing line guide system of claim 1 wherein the distance between the geometric center of said primary or proximal circular guide ring and the fishing rod is from about 1.0 inch to about 1.7 inches.

6. The fishing line guide system of claim 1 wherein the distance between the geometric center of said primary or proximal circular guide ring and the fishing rod is from about one-half (½) to about one-third (⅓) the distance from the center line of the spinning reel.

7. The fishing line guide system of claim 1 wherein the distance between said primary or proximal circular guide ring and said second or distal circular guide ring is from about one-fourth (¼) inch to about 2 inches.

8. The fishing line guide system of claim 7 wherein the inside diameter of said primary or proximal circular guide ring is from about three-fourths (¾) inches to about one and one-fourth (1¼) inches and the inside diameter of said secondary or distal circular guide ring is from about three fifths (⅗) of an inch to about one half (½) of an inch.

9. The fishing line guide system of claim 1 wherein the distance between said secondary or distal circular guide ring and said primary or proximal circular guide ring is from about 0.2 times to about 2.0 times said inside diameter of said primary or proximal circular guide ring.

10. The fishing line guide system of claim 1, wherein said secondary or distal guide frame extension is affixed or attached to the primary or proximal guide frame extension.

* * * * *